US005141019A

United States Patent [19]

LeBlanc et al.

[11] Patent Number: 5,141,019

[45] Date of Patent: Aug. 25, 1992

[54] TWO STAGE AUTOMATIC SHUTOFF VALVE

[75] Inventors: Leo J. LeBlanc, Bloomfield Hills; Bruce R. Johnson, Muskegon, both of Mich.

[73] Assignee: EBW, Inc., Muskegon, Mich.

[21] Appl. No.: 725,281

[22] Filed: Jul. 3, 1991

Related U.S. Application Data

[63] Continuation-in-part of Ser. No. 647,282, Jan. 29, 1991, Pat. No. 5,095,937, which is a continuation-in-part of Ser. No. 534,442, Jun. 6, 1990, Pat. No. 5,010,915.

[51] Int. Cl.[5] ...................... F16K 21/18; F16K 31/22; F16K 33/00;

[52] U.S. Cl. ................................... 137/423; 137/312; 137/432; 137/448; 141/128; 141/198; 251/212

[58] Field of Search ............... 137/312, 400, 403, 428, 137/432, 445, 448; 141/86, 128, 198, 212, 213, 216; 222/68; 251/89.5, 149.9, 212

[56] References Cited

U.S. PATENT DOCUMENTS

| | | |
|---|---|---|
| 979,819 | 12/1910 | Anderson . |
| 1,219,222 | 3/1917 | Baxter et al. . |
| 1,246,033 | 11/1917 | Adams . |
| 1,262,443 | 4/1918 | Cahill . |
| 1,268,947 | 6/1918 | Fell . |
| 1,289,490 | 12/1918 | Lundstrom . |
| 1,312,531 | 8/1919 | Garbisch . |
| 1,313,386 | 8/1919 | Jones . |
| 1,360,869 | 11/1920 | Beliveau . |
| 1,462,253 | 7/1923 | Tobiasson . |
| 1,463,129 | 7/1923 | Milton . |
| 1,689,066 | 10/1928 | Baxter . |
| 1,859,009 | 5/1932 | Stetson . |
| 1,892,455 | 12/1932 | Ayers . |

(List continued on next page.)

FOREIGN PATENT DOCUMENTS

| | | |
|---|---|---|
| 620649 | 9/1927 | France . |
| 1360869 | 4/1963 | France . |
| 1444260 | 10/1973 | France . |
| 2331732 | 11/1975 | France . |
| 1531083 | 2/1976 | France . |
| 2355736 | 6/1976 | France . |

OTHER PUBLICATIONS

Emco-Wheaton Advertisement for the A 1100 Guardian, "Petroleum-Marketer", Sep.-Oct., 1990.

OPW Advertisement for OPW 61-50, "Petroleum--Marketer", Sep.-Oct., 1990.

*Primary Examiner*—George L. Walton

*Attorney, Agent, or Firm*—Basile and Hanlon

[57] ABSTRACT

A two stage float actuated shutoff valve for preventing overfilling of an underground storage tank has a first float actuated valve flapper movable to a closed position to block a major portion of the fuel inlet passage of the underground tank when the level of fuel in the tank rises to a first predetermined level. Closure of the first valve blocks a first portion of the flow passage while maintaining a second portion of the flow passage open to permit a reduced flow of fuel through the flow passage, thereby generating an observable water hammer effect signalling that the filling operation should be terminated. If the incoming flow is not terminated, the continued rise of the level of fuel in the tank will in time actuate a second float controlled valve to completely close the fuel inlet passage. The incoming fuel is supplied from a delivery truck tank, fuel flowing gravitationally from the truck tank through an operable shutoff valve on the tank, a delivery hose and a drop tube into the underground tank. Once closed, the second float controlled valve will remain closed as long as the truck tank shutoff valve is open, upon closure of the truck tank shutoff valve the resulting reduction of the hydraulic head on the second valve is reduced to a head which can be overcome by a spring biasing the second valve to its open position to so that fuel can be drained from the delivery hose and drop tube into the underground tank.

18 Claims, 3 Drawing Sheets

U.S. PATENT DOCUMENTS

| | | | |
|---|---|---|---|
| 1,978,314 | 10/1934 | Lancaster . | |
| 2,199,085 | 4/1940 | Smith . | |
| 2,299,360 | 10/1942 | Tharp | 137/448 |
| 2,340,936 | 2/1944 | Cook . | |
| 2,499,409 | 3/1950 | Norway . | |
| 2,569,110 | 9/1951 | McGillis et al. | 137/448 |
| 2,578,926 | 12/1951 | Douglas | 141/213 |
| 2,685,891 | 8/1954 | Seqelhorst et al. . | |
| 2,705,372 | 4/1955 | Cornell . | |
| 2,773,706 | 12/1956 | Leavell . | |
| 2,811,179 | 10/1957 | Greenwood . | |
| 2,918,931 | 12/1959 | Siri . | |
| 2,918,932 | 12/1959 | Few . | |
| 3,078,867 | 2/1963 | McGillis et al. | 137/448 |
| 3,189,039 | 6/1965 | Bauer . | |
| 3,347,263 | 10/1967 | Thompson . | |
| 3,438,316 | 4/1969 | Rodier . | |
| 3,495,635 | 2/1970 | Yuvirov . | |
| 3,563,263 | 2/1971 | Benson . | |
| 3,610,273 | 10/1971 | Russell . | |
| 3,661,175 | 5/1972 | Tillman . | |
| 3,732,902 | 5/1973 | Muller | 137/423 |
| 3,787,022 | 1/1974 | Wilcox . | |
| 3,791,407 | 2/1974 | Nicholls . | |
| 3,794,077 | 2/1974 | Fanshier . | |
| 3,799,502 | 3/1974 | Baum | 251/212 |
| 3,895,402 | 7/1975 | Page . | |
| 3,963,041 | 6/1976 | McGillis . | |
| 4,175,296 | 11/1979 | Goldman . | |
| 4,266,582 | 5/1981 | Sergent | 137/423 |
| 4,396,034 | 8/1983 | Cherniak . | |
| 4,407,325 | 10/1983 | Cherniak . | |
| 4,469,116 | 9/1984 | Hansen . | |
| 4,573,495 | 3/1986 | Rothe et al. | 137/432 |
| 4,630,655 | 12/1986 | Fleischer et al. . | |
| 4,667,711 | 5/1987 | Draft | 137/448 |
| 4,703,874 | 11/1987 | Tapperman et al. . | |
| 4,793,387 | 12/1988 | LeBlanc et al. . | |
| 4,986,320 | 1/1991 | Kesterman et al. | 137/630.15 |
| 4,998,571 | 3/1991 | Blue et al. | 141/213 |

TWO STAGE AUTOMATIC SHUTOFF VALVE

REFERENCE TO RELATED APPLICATIONS

This application is a continuation in part of a commonly owned co-pending application Ser. No. 07/647,282, filed Jan. 29, 1991, now U.S. Pat. No. 5,095,937 in turn a continuation in part of a commonly owned co-pending application Ser. No. 07/534,442, filed Jun 6, 1990, now U.S. Pat. No. 5,010,915.

BACKGROUND OF THE INVENTION

The present invention relates to a float actuated shutoff valve operable to shut off the incoming flow of liquid into a closed storage tank when the level of liquid within the tank rises to a predetermined level to prevent overfilling of the tank. Although useful in other applications, the valve of the present application was designed for use in underground fuel storage tanks employed at gasoline service stations.

The standard method of determining the level of fuel in an underground storage tank at a service station is to insert a gauge pole into the tank through the fill pipe. Very few underground tanks are equipped with any sort of measuring device which will give a continuous indication of how much fuel is in the tank, and very few fuel delivery trucks which fill such underground storage tanks are equipped with any indicator which will give a continuous measurement of the amount of fuel discharged from the tank truck. The conventional method of measuring the amount of fuel delivered into the underground storage tank is to utilize the gauge pole before and after, but not during, the fuel delivery. As a result, it is quite common that the underground tank is overfilled and a substantial amount of fuel is spilled when the delivery hose is disconnected from the underground tank fill pipe.

As set forth in the parent applications referred to above, various forms of float actuated shutoff valves have been devised to stop the flow of fuel into the underground tank when the level of fuel within the tank rises to a preselected level, as, for example, 95% of the tank capacity.

Typically, a flapper valve is employed, the valve when open extending vertically upwardly from a horizontal pivot axis at one side of the flow passage, shielded from the downward flow of fuel through the passage. The flapper is pivoted outwardly into the downward flow in response to upward movement of an actuating float by the rising level of fuel within the tank. In such an arrangement, the flapper is driven to its seat with a substantial force generated by the downward flow of fuel, and closure of the flapper valve generates a substantial water hammer which is intended to signal the delivery man that it is time to turn off the valve on the tank truck.

Assuming the delivery man is paying attention and immediately closes the tank truck valve to terminate the flow of fuel into the underground tank, the flapper valve normally is located somewhere below the top of the underground tank fill pipe, and closure of the flapper valve traps a fairly substantial quantity of fuel above the valve in the fill pipe and in the delivery hose downstream of the shutoff valve on the tank truck. The amount of fuel so trapped may be as much as 30-35 gallons, and this fuel will be spilled when the delivery hose is uncoupled from the fill pipe because the closed flapper valve prevents the fuel from draining into the underground tank. Various solutions to this problem have been proposed in the prior art.

A very common solution is to provide a relatively small drain hole through the valve flapper so that when the flapper is closed, fuel trapped above the flapper can drain through the drain hole into the underground tank. While this is a seemingly simple and straightforward solution to the problem outlined above, the sizing of this drain hole is, to some extent, a matter of personal preference. If it could be assumed the delivery man would always be attentive and shut off the tank truck valve immediately upon observing the water hammer effect occasioned by closure of the flapper valve, then the drain hole might be made relatively large in order to provide rapid drainage of the 30-35 gallons trapped above the closed valve. However, if the delivery man does not shut off the tank truck valve fairly promptly after the flapper valve closes, a relatively rapid flow of fuel downwardly through a relatively large drain hole in the closed flapper can result in the overfilling of the tank to the point where the delivery hose cannot be drained.

If, on the other hand, a relatively small diameter drain hole is employed, then a substantial amount of time will be required to drain the delivery hose, and an impatient delivery man may uncouple the delivery hose from the fill pipe before the delivery hose has fully drained.

The parent applications identified above both address this problem utilizing a two stage shutoff valve in which a rise of the level of fuel within the tank to a first level, say 90% of tank capacity, will elevate a first float which closes a first flapper. When closed, the first flapper does not completely close the incoming flow passage but may close, for example, 90% of the passage. In this last example, closure of the first flapper reduces the rate at which fuel flows into the storage tank by 90 % — in other words, from a normal flow rate of 300-400 gallons per minute to a flow rate of 30-40 gallons per minute. Closure of the first flapper will generate a water hammer effect sufficient to be observable by the delivery man. In the case of a 10,000 gallon storage tank, at the time the first flapper closes, indicating that 9,000 gallons are in the tank, there is still room for another 500 gallons, if filling is to be terminated at 95% capacity, and this affords the delivery man up to 10 or 12 minutes leeway to close the shutoff valve. If the delivery man does not stop fuel delivery before the tank is 95% filled, a second float will actuate a second valve flapper which closes off the remaining portion of the flow passage so that no more fuel can flow into the tank. In this event, fuel will be trapped in the delivery hose.

Where the underground tank fill pipe is provided with an overfill storage container such as that of U.S. Pat. No. 4,793,387, for example, the delivery hose may be simply drained into the overfill container from which it is subsequently drained into the underground tank. Otherwise, drainage of the delivery hose is a time-consuming process since the hose must be drained through the fill pipe and into the underground tank through relatively restricted openings in the overfill valve housing through which valve actuating mechanism coupled to the valve flappers within the housing passes to connect to the actuating floats at the exterior of the valve housing.

The present invention is directed to a two stage valve whose second stage will close at a predetermined maximum level of fuel within the storage tank and will open when the shutoff valve on the tank truck has been closed to permit fuel to drain from the delivery hose into the underground tank, the first stage flapper also being moveable to its open position to accelerate the drainage.

SUMMARY OF THE INVENTION

A two stage shutoff valve according to the present invention includes a cylindrical valve housing mounted at the lower end of a relatively long drop tube suspended from its upper end at the upper end of the fill pipe and extending downwardly through the fill pipe into the underground tank to a location substantially below the top of the tank. Within the valve housing, a flow passage extends downwardly through an upwardly facing annular valve seat with a main and a secondary flapper pivotally mounted on the seat within the housing at opposite sides of the passage. Each flapper is mounted for pivotal movement about a horizontal axis and formed with an integral crank portion which is coupled by a link to the lower end of a vertically disposed actuating rod, the actuating rod passing upwardly through guide bores in the housing to extend upwardly along the outer side of the drop tube. The guide rods coupled to the main and secondary flappers are respectively coupled at their upper ends to lower and upper floats slidably received on the exterior of the drop tube. The geometry of the actuating rodlink and crank arm of each flapper is such that when the actuating rod is at a lower end limit of movement, its associated flapper is in a valve open position in which the flapper extends substantially vertically upwardly from its horizontal pivot axis to be located beneath an overhang in the valve housing which shields the flapper from downward flow of fuel.

In accordance with the present invention, compression springs coiled about each of the two actuating rods are engaged between the rod and valve housing to resiliently bias the rod downwardly, and thus resiliently bias the associated flapper to its valve open position. The strength of the spring associated with the secondary valve flapper is chosen to be such that, when the secondary flapper is in its closed position, the spring will generate sufficient force to open the secondary flapper against a static head of fuel represented by the height of the level of fuel in the tank truck shutoff valve above the level of fuel in the underground tank. The strength of the spring associated with the main flapper is selected to be sufficient to open the main flapper against a static head represented by the difference in elevation between the level of fuel in the tank and the level of fuel in the fill pipe.

Other objects and features of the invention will become apparent by reference to the following specification and to the drawings.

IN THE DRAWINGS

Figure 1:
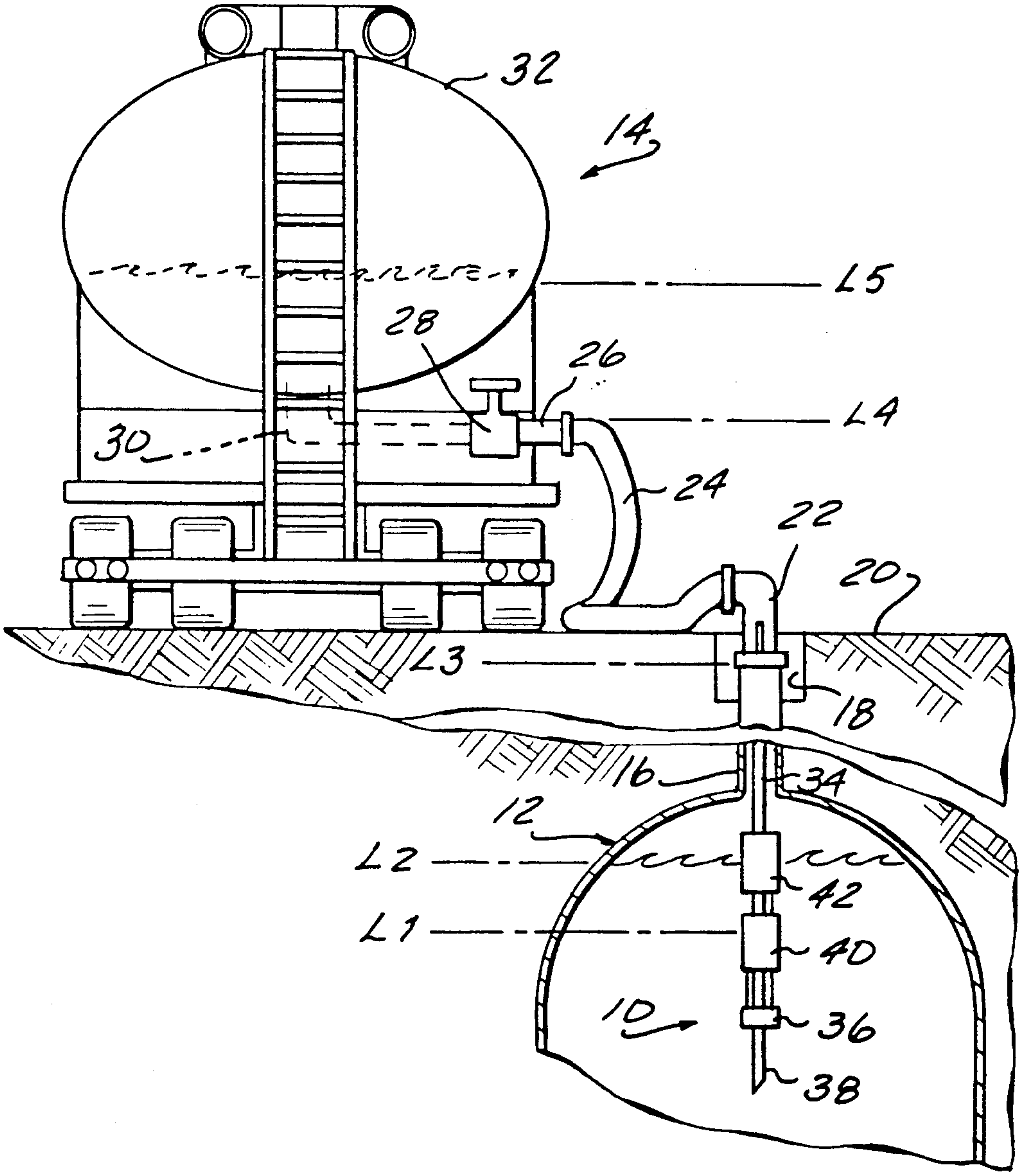
FIG. 1 is a simplified sketch, partially in cross-section, showing the filling of an underground storage tank utilizing a two stage automatic shutoff valve embodying the present invention.

In FIG. 1, a valve embodying the present invention designated generally 10 is shown being employed to control the filling of an underground gasoline storage tank designated generally 12 from a conventional gasoline delivery truck designated generally 14. The underground storage tank 12 is provided with a fill pipe 16 which extends upwardly from the tank to an upper end which is located within a relatively shallow manhole 18 in the service station apron 20. A coupling elbow 22 is employed to couple the upper end of fill pipe 16 to one end of a delivery hose 24 whose opposite end is coupled to a delivery port 26 of a shutoff valve 28 on the tanker, the inlet of the valve 28 being in communication with a storage compartment of the tanker. When valve 28 is open, fuel flows by gravity from the tank 32 through pipe 30, valve 28, outlet 26, hose 24 and coupling 22 to the top of fill pipe 16. In the present case, the hydraulic connections between coupling 22 and fill pipe 16 are such that all fuel flowing into coupling 22 from delivery hose 24 is passed into the interior of an elongate drop tube 34 which projects freely downwardly through fill pipe 16 well into the interior of the underground tank 12. The valve 10 of the present invention includes a valve housing 36 mounted at the lower end of drop tube 34, a further downward extension 38 of drop tube may project downwardly from valve housing 36. A pair of hollow tubular floats 40, 42 are slidably received upon the exterior of drop tube 34 above valve housing 36 and are respectively coupled to a main 44M and a secondary 44S valve flapper (FIG. 3) located within housing 36 to control the flow of fuel into the tank in accordance with the level of fuel in the tank.

For purposes of simplicity in the description of the present invention, the elbow 22 shown in FIG. 1 is of the type employed in a dual point vapor recovery system in which the elbow 22 is connected only to receive fuel from the tank truck. Vapor expelled from the underground tank during the filling of the tank is handled by a separate connection (not shown) to the headspace of the tank. The valve of the present invention is readily adapted for use either in such a dual point vapor recovery system or a so-called co-axial vapor recovery system in which fuel vapor expelled during the filling operation passes upwardly through the annular passage between the outer side of drop tube 34 and the inside of fill pipe 16. A co-axial elbow (not shown) conducts fuel into the drop tube and conducts vapor from the annular passage between drop tube 34 and fill pipe 16 to a second hose (not shown), conventionally connected to conduct vapor into the headspace of the tanker compartment from which fuel is being dispensed.

The valve 10 of the present invention is essentially the two stage automatic shutoff valve disclosed in parent application Ser. No. 07/647,282 to which biasing springs biasing the respective main and secondary valve flappers toward their open position have been added. As will be explained below, the addition of these springs provides a substantially foolproof system for draining the tank truck delivery hose, even in worst-case situations. For purposes of simplifying the explanation of the present invention, many of the features of the two stage valve of parent application Ser. No. 07/647,282 not directly related to the present invention have been omitted from the present disclosure. A complete disclosure of all these omitted features can be found in parent application Ser. No. 07/647,282, whose disclosure is incorporated herein by reference.

Figure 2:
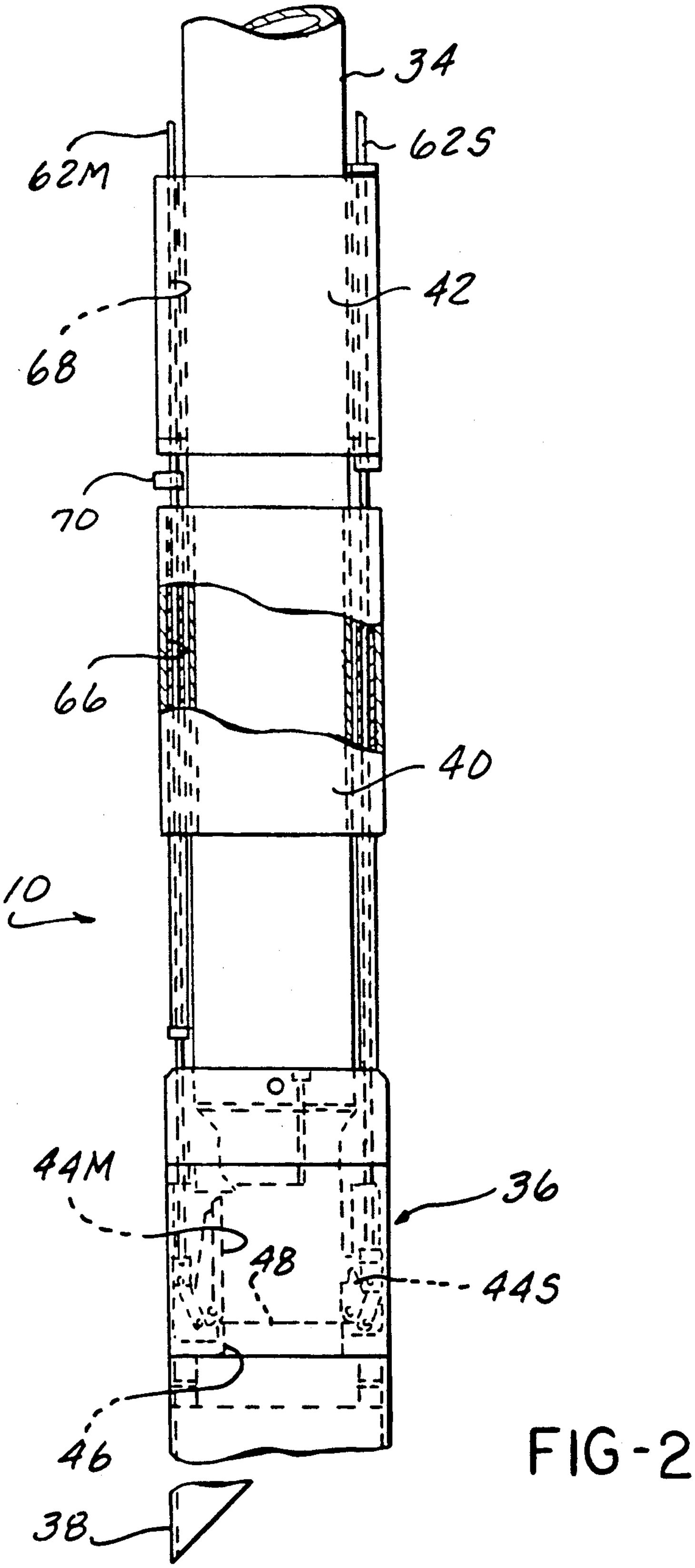
FIG. 2 is a side elevational view, partially in section, showing further details of the two stage valve of FIG. 1.

A simplified overall view of the valve 10 in FIG. 2 shows valve housing 36 mounted at the lower end of drop tube 34. Above housing 36, a lower float 40 and an upper float 42, both of hollow tubular construction, are slidably received upon the exterior of drop tube 34. Within valve housing 36, a main valve flapper 44M and a secondary valve flapper 44S shown in their open positions in FIG. 2 are mounted at opposite sides of a central flow passage which extends downwardly through the housing, and upwardly facing valve seat 48 being located at the upper end of a relatively narrow diameter portion 46 of the flow passage.

Figure 4:
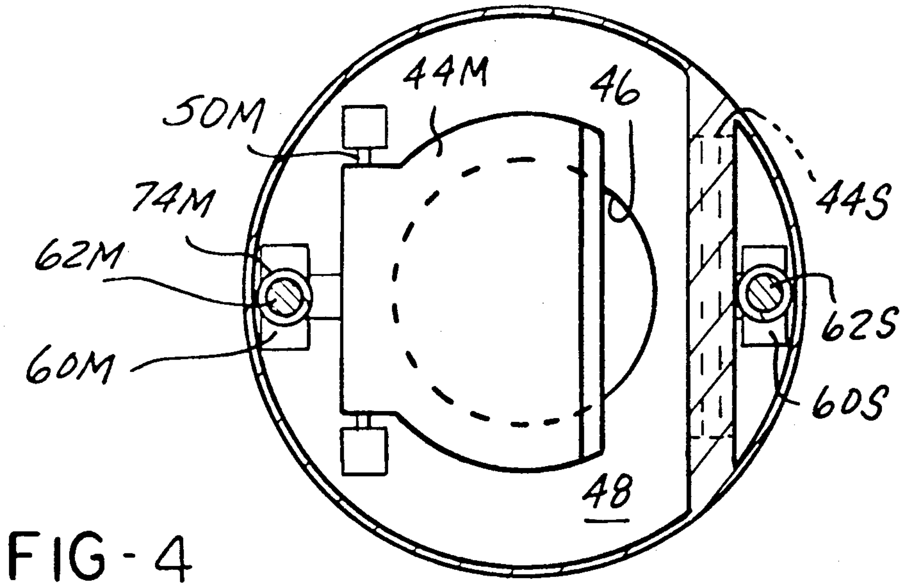
FIG. 4 is a cross-sectional view taken on line 4—4 of FIG. 3.
Figure 3:
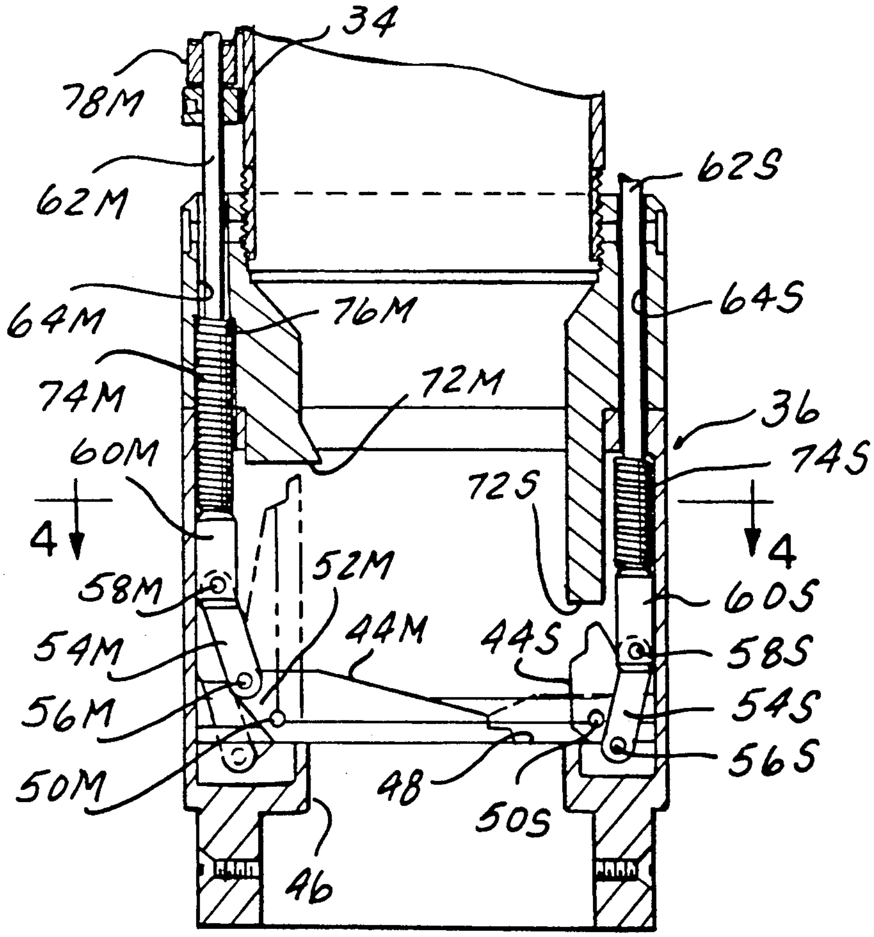
FIG. 3 is a detailed cross-sectional view taken on an axial plane, of the valve of FIG. 1.

Referring now to FIG. 3, in this figure the main valve flapper 44M is shown in its closed position extending generally horizontally from its pivot axis 50M to be seated upon valve seat 48 and, as best seen in the cross-sectional view of FIG. 4, blocking a major portion of flow passage 46. Returning now to FIG. 3, the main valve flapper 44M is formed with a crank portion 52M which is coupled to one end of a link 54M by a pivot 56M. A second pivot 58M at the opposite end of link 54M couples the link to a clevis 60M fixedly mounted at the lower end of an elongate actuating rod 62M. Rod 62M projects upwardly slidably through a vertical bore 64M in housing 36.

Referring now to FIG. 2, actuating rod 62M extends upwardly from housing 36 freely through a vertical bore 66 in lower float 40 and freely through another vertical bore 68 in upper float 42. A stop collar 70 fixedly mounted at a selected position on rod 62M above lower float 40 is employed to actuate the main valve flapper 44M in the following manner. Referring now to FIG. 3, with lower float 40 at a lowered position representing a reduced level of fuel within the underground storage tank, main valve flapper 44M will be located in the vertical open position indicated in broken line in FIG. 3. When in this open position, flapper 44M is shielded from the downward flow of fuel through drop tube 34 and the flow passage 46 by an overhanging shield portion 72M. Main flapper 44M is biased to the open position shown in broken line in FIG. 3 by a compression spring 74M which is coiled around actuating rod 62M and engaged between a downwardly facing shoulder 76 of bore 64M and the upper end of clevis 60M — spring 74M biasing actuating rod 62M downwardly, thereby urging link 54M downwardly to the broken line position shown in FIG. 3 to pivot the main flapper 44M to the open position indicated in broken line.

As the level of fuel within the tank rises, eventually lower float 40 will be buoyed up by the rising fuel and move upwardly to engage stop collar 70 (FIG. 2). Further, upward movement of float 40 will begin to move actuating rod 62M upwardly against the biasing action of spring 74, and as rod 62M moves upwardly, link 54M will pivot flapper 44M in a clockwise direction above pivot 50M as shown in FIG. 3. Once the upper tip of flapper 44M moves outwardly from beneath shield 72M, it moves into the downward flow of fuel and is driven by the downwardly flowing fuel violently to the closed position shown in FIG. 3 in full line. Typical valve open fuel flow rates are in the range of 300 to 400 gallons per minute, and the rapid closure of main flapper 44M blocks off, as best seen in FIG. 4, a substantial portion of flow passage 46. This sudden reduction in the cross-sectional area available for fuel flow generates a substantial water hammer which is intended to alert the delivery man that the time has arrived for shutting off the flow of fuel from the tanker into the delivery hose.

Referring to FIG. 1, this closure of the main flapper 44M typically might be set to occur when the level of fuel within the underground tank 12 rises to the level L1, a level which, for example, might be chosen to be approximately 90% of the tank's capacity. In the case where the capacity of tank 12 is 10,000 gallons, closure of main flapper 44M when the tank is 90% full leaves room within the tank for an additional 1,000 gallons of fuel. Closure of main flapper 44M has restricted the flow passage for incoming fuel to an amount which is typically from 10-20% of the valve open flow rate, hence when main flapper 44M closes fuel continues to flow into the tank at a rate of about 30 to 60 gallons per minute, and if the delivery man has observed the water hammer generated by closure of main flapper 44M, he has plenty of time to close valve 26. Upon timely closure of valve 26, the 35 gallons or so of fuel in the delivery hose and drop tube between tank truck valve 26 and overfill valve 10 can easily drain into tank 12 through the partially open valve 10.

However, for one reason or another, the delivery man may not observe the delivery hose kick induced by closure of the main flapper or, in the interest of putting as much fuel into the underground tank as possible, may delay for too long closing the delivery valve on the tank truck. In this situation, fuel will continue to flow into the underground tank at a reduced rate until the level of fuel in the tank rises to a level at which upper float 42 is buoyed upwardly to induce closure of the secondary flapper 44S.

Secondary flapper 44S is controlled in the same manner as main flapper 44M. The same reference numerals with suffixes M and S are employed to identify corresponding parts associated respectively with the main flapper 44M and secondary flapper 44S. As was the case with the main flapper, secondary flapper 44S is normally biased to its open position by spring 74S and, when in its open position as shown in full line in FIG. 3, is shielded from the downward flow of fuel by an undercut shoulder 72S. When upper float 42 is elevated by the rising level of fuel within the underground tank 12, the upward movement of actuating rod 62S pivots the secondary flapper 44S in a counterclockwise direction about its pivot pin 50S, eventually moving the distal edge of the flapper outwardly into the downward flow of fuel which is flowing through the restricted passage established by the prior closure of the main flapper 44M. Flapper 44S is driven to its closed position indicated in broken line in FIG. 3, and when in its closed position closes that portion of the flow passage not previously closed by flapper 44M to thereby completely block flow passage 46 and thus prevent any further flow of fuel into tank 12.

Referring now to FIG. 1, it will be assumed that float 42 is set to actuate secondary flapper 44S to its closed position when the tank 12 is filled to 95% of its capacity, this particular fuel level being indicated in FIG. 1 as level L2. With the overfill valve 10 now completely closed by the closure of both its main and secondary flappers 44M and 44S, and the tank truck delivery valve 28 still open, there is a static head of fuel holding the two flappers 44M, 44S in their closed position equal to the difference in elevation between the level of fuel L5 in tank truck 14 and the level of fuel L2 in the underground storage tank. Flappers 44M and 44S are actually located at 36 in FIG. 1, however, the static head represented by this difference in elevation between the level of the flappers and level L2 acts upwardly on the underside of the flappers, thus leaving the net static head urging the flappers to their closed positions as the head between levels L5 and L2.

Spring 74S which biases the secondary flapper 44S toward its open position is constructed with a spring characteristic such that the opening force applied to flapper 44S when in its closed position is sufficient to overcome a static head established by the difference in level between the level L4 of the tank truck shutoff valve 28 and level L2, but is insufficient to overcome the static head between the level of fuel L5 in the tank truck and level L2 in the underground tank. Thus, the valve flappers 44M and 44S will remain closed until the shutoff valve 28 on the tank truck is closed so that the head on secondary flapper 44S now becomes that representative of the difference in elevation between level L2 and L4, which head can be overcome by spring 74S. This opens the secondary valve to accommodate drainage of fuel from the delivery hose into the underground tank at a reduced rate initially, however, the characteristic of the main flapper biasing valve 74M is selected to be such that it will open main flapper 44M after the delivery hose has been drained and the level of fuel has dropped to a level L3 at o below the top of drop tube 34.

The elevation of the delivery valve 28 on the tank truck above ground level is a standard dimension, however, the depth at which the underground tank 12 is located will vary in dependence upon local code requirements and the frost line. The characteristics of springs 74M and 74S may be selected accordingly with some adjustment as might be required being available by the adding of weight such as 78M (FIG. 3) to one or both of the actuating rods as may be required to achieve the desired response.

While one embodiment of the invention has been described in detail, it will be apparent to those skilled in the art the disclosed embodiment may be modified. Therefore, the foregoing description is to be considered exemplary rather than limiting, and the true scope of the invention is that defined by the following claims.

We claim:

1. A float actuated overfill prevention valve for controlling the gravitational flow of fuel from an elevated supply tank into an underground storage tank via an opened closeable shutoff valve adjacent the bottom of said supply tank and a delivery hose connecting said shutoff valve to the upper end of a fuel conducting drop tube extending downwardly into said storage tank to a fuel discharge and substantially below the to of said storage tank, said valve being mounted in said drop tube and having a central vertical flow passage for discharging fuel from said drop tube into said storage tank, an upwardly facing valve seat in said flow passage, a first float actuated flapper mounted above said valve seat for pivotal movement about a first horizontal axis at one side of said flow passage and pivotal between an open position upwardly inclined from said first axis and shielded from the downward flow of fuel through said flow passage and a closed position in face-to-face engagement with said seat in which said first flapper blocks a first portion of said flow passage while maintaining a second portion of the flow passage open to permit a reduced flow of fuel through the flow passage, first spring means biasing said first flapper to said open position, and first float means coupled to said first flapper for pivoting said first flapper from its open position into the downward flow of fuel through said flow passage when the level of fuel in said storage tank rises to a preselected first level, said downward flow of fuel being operable to drive said first flapper forcibly to its closed position against the bias of said first spring means to generate an observable water hammer effect upon said delivery hose, thereby indicating that the shutoff valve should be closed.

2. The invention defined in claim 1 wherein said first spring means biases said first flapper to its open position with a force sufficient to return said first flapper form its closed position to its open position against the net static head of fuel within said drop tube when said drop tube is filled with fuel.

3. The invention defined in claim 1 wherein said first flapper when in its closed position blocks a major portion of said flow passage.

4. The invention defined in claim 1 wherein movement of said first flapper to its closed position reduces the rate of flow of fuel through said flow passage by at least 80%.

5. A float actuated overfill prevention valve for controlling the gravitational flow of fuel form an elevated supply tank into an underground storage tank via an opened manually closeable shutoff valve adjacent the bottom of said supply tank and a delivery hose connecting said shutoff valve to the upper end of a fuel conducting drop tube extending downwardly into said storage tank to a fuel discharge end substantially below the top of said storage tank, said valve being mounted in said drop tube and having a central vertical flow passage for discharging fuel from said drop tube into said storage tank, an upwardly facing valve seat in said flow passage, a first float actuated flapper mounted above said valve seat for pivotal movement about a first horizontal axis at one side of said flow passage and pivotal between an open position upwardly inclined from said first axis and shielded from the downward flow of fuel through said flow passage and a closed position in face-to-face engagement with said seat in which said first flapper blocks a substantial portion of said flow passage, first spring means biasing said first flapper to said open position, and first float means coupled to said first flapper for pivoting said first flapper from its open position into the downward flow of fuel through said flow passage when the level of fuel in said storage tank rises to a preselected first level, said downward flow of fuel being operable to drive said first flapper forcibly to its closed position against the bias of said first spring means to generate an observable water hammer effect upon said delivery hose, said valve further comprising a second float actuated flapper mounted above said valve seat for pivotal movement about a second horizontal axis at the opposite side of said flow passage and pivotal between an open position inclined upwardly from said second axis and shielded from the downward flow of fuel through said flow passage and a closed position in face-to-face engagement with said seat in which said second flapper blocks all of that portion of said flow passage not blocked by said first flapper when said first flapper is in its closed position, second spring means biasing said second flapper to its open position, and second float means coupled to said second flapper for pivoting said second flapper form its open position into the downward flow of fuel through said flow passage when the level of fuel within said storage tank rises to a preselected second level above said first level, said downward flow of fuel being operable to pivot said second flapper to its closed position, said first and second flappers when both located in their respective closed positions completely blocking said flow passage to prevent the flow of fuel into said said tank.

6. The invention defined in claim 5 wherein said second spring means biases said second flapper to its open position with a force sufficient to return said second flapper from its closed position to its open position against the net static head of fuel between said second flapper and said shutoff valve and insufficient to open said said flapper against the net static head thereon when said shutoff valve is open.

7. The invention defined in claim 6 wherein said first flapper when in its closed position blocks a major portion of said flow passage.

8. The invention defined in claim 6 wherein movement of said first flapper to its closed position reduces the rate of flow of fuel through said flow passage by at least 80%.

9. A float actuated overfill prevention valve for controlling the gravitational flow of fuel from an elevated supply tank into an underground storage tank via an opened manually closeable shutoff valve adjacent the bottom of said supply tank and a delivery hose connecting said shutoff valve to the upper end of a fuel conducting drop tube extending downwardly into said storage tank to a fuel discharge end substantially below the top of said storage tank, said valve comprising first float actuated valve means in said drop tube movable from an open position to a closed position in response to the rise of the level of fuel within said storage tank to a predetermined first level, movement of said first valve means to its closed position substantially instantaneously reducing the rate of discharge of fuel into said tank to less than 50% of the rate of discharge when said first valve means is open to generate an observable effect signalling closure of said first valve means, second float actuated valve means in said drop tube movable from an open position to a closed position in response to the rise of the level of fuel in said storage tank above said first level to a predetermined second level, movement of said second valve means to its closed position reducing the rate of discharge of fuel into said tank to zero, and means for automatically maintaining said second valve means in its closed position until said shutoff valve is closed to terminate the flow of fuel from said supply tank into said delivery hose and for shifting said second valve means to its open position to drain said delivery hose into said storage tank only after said shutoff valve has been closed.

10. A float actuated overfill prevention valve for controlling the flow of liquid from an elevated liquid supply source downwardly into a liquid storage tank, said valve comprising an elongate drop tube extending downwardly through the top of said tank to a lower end located in the interior of said tank substantially below the top of said tank, said drop tube having a flow passage therethrough for conducting liquid from said supply source downwardly through said tube to discharge fluid from the lower end of said tube into said tank, flapper valve means in said tube including a main flapper pivotal about a horizontal axis between a normally maintained upwardly inclined open position at one side of said flow passage in a recess wherein said main flapper is substantially shielded from the flow of liquid downwardly through said passage and a substantially horizontal closed position wherein said main flapper is seated upon an upwardly facing valve seat in said flow passage to block at least a major portion of the flow passage against the flow of fluid downwardly through said flow passage while maintaining a lesser portion of the flow passage open to permit a reduced flow of liquid through the flow passage, a first hollow tubular float slidably received on the exterior of said drop tube within said tank, main link means coupled at one end to said main flapper and coupled at its other end to said first float for pivoting said main flapper from its shielded closed position in said recess into the downward flow of liquid in said passage in response to upward movement of said first float induced by the rise of the level of liquid in said tank above a first preselected level, said main link means including first spring means biasing said main link means in a direction urging said main flapper to said closed position with a force sufficient to overcome the static head of liquid in said drop tube above said main flapper when said main flapper is in said closed position, thereby generating a water hammer effect to indicate that the flow of liquid should be shut off.

11. A float actuated overfill prevention valve for controlling the flow of liquid from an elevated liquid supply source downwardly into a liquid storage tank, said valve comprising an elongate drop tube extending downwardly through the top of said tank to a lower end located in the interior of said tank substantially below the top of said tank, said drop tube having a flow passage therethrough for conducting liquid from said supply source downwardly through said tube to discharge fluid from the lower end of said tube into sad tank, flapper valve means in said tube including a main flapper pivotal about a horizontal axis between a normally maintained upwardly inclined open position at one side of said flow passage in a recess wherein said main flapper is substantially shielded from the flow of liquid downwardly through said passage and a substantially horizontal closed position wherein said main flapper is seated upon an upwardly facing valve seat in said flow passage to block at least a major portion of the flow passage against the flow of fluid downwardly through said flow passage, a first hollow tubular float slidably received on the exterior of said drop tube within said tank, main link means coupled at one end to said main flapper and coupled at its other end to said first float for pivoting said main flapper from its shielded closed position in said recess into the downward flow of liquid in said passage in response to upward movement of said first float induced by the rise of the level of liquid in said tank above a first preselected level, said main link means including first spring means biasing said main link means in a direction urging said main flapper to said closed position with a force sufficient to overcome the static head of liquid in said drop tube above said main flapper when said main flapper is in said closed position, said main link means including a crank arm fixed to said main flapper, a link pivotally connected at one end to said crank arm, and an elongate rigid rod pivotally connected at one end to the other end of said link and extending from said link vertically along said drop tube, said first float having a vertical bore therethrough slidably receiving said rod, and upper and lower stop collars fixedly mounted upon said rod at selected positions respectively above the top and below the bottom of said first float to accommodate a limited amount of vertical movement of said first float relative to said rod.

12. The invention defined in claim 11 wherein said flapper valve means is located near the lower end of said drop tube and said first float means is slidably received on said drop tube at a location spaced above said valve means.

13. The invention defined in claim 12 wherein said flapper valve means includes a flapper valve housing mounted at the lower end of said drop tube, said flow passage extending downwardly from said drop tube through said housing, said rod being slidably received in a vertical bore through said housing having a downwardly facing radial shoulder at its lower end, and means defining an upwardly facing shoulder adjacent the lower end of said rod, said first spring means comprising a coil spring coiled about said rod and engaged in compression between said shoulders.

14. The invention defined in claim 13 wherein said drop tube is threadably received in the upper end of said housing, said housing having an outer diameter $D_1$ greater than the outer diameter $D_2$ of said drop tube, said first float having an outer diameter $D_3 < D_1$ and an inner diameter $D_4 < D_2$.

15. A float acutated overfill prevention valve for controlling the flow of liquid from an elevated liquid supply source downwardly into a liquid storage tank, said valve comprising an elongate drop tube extending downwardly through the top of said tank to a lower end located in the interior of said tank substantially below the top of said tank, said top tube having a flow passage therethrough for conducting liquid from said supply source downwardly through said tube to discharge fluid from the lower end of said tube into said tank, flapper valve means in said tube including a main flapper pivotal about a horizontal axis between a normally maintained upwardly inclined open position at one side of said flow passage in a recess wherein said main flapper is substantially shielded from the flow of liquid downwardly through said passage and a substantially horizontal closed position wherein said main flapper is seated upon an upwardly facing valve seat in said flow passage to block at least a major portion of the flow passage against the flow of fluid downwardly through said flow passage, a first hollow tubular float slidably received on the exterior of said drop tube within said tank, main link means coupled at one end to said main flapper and coupled at its other end to said first float for pivoting said main flapper from its shielded closed position in said recess into the downward flow of liquid in said passage in response to upward movement of said firs float induced by the rise of the level of liquid in said tank above a first preselected level, said main link means including first spring means biasing said main link means in a direction urging said main flapper to said closed position with a force sufficient to overcome the static head of liquid in said drop tube above said main flapper when said main flapper is in said closed position, wherein said flapper valve means further comprises a secondary valve flapper pivoted about a horizontal axis between a normally maintained open position at the side of said flow passage opposite said one side in a recess wherein said secondary flapper is shielded from the flow of liquid downwardly through said passage and a substantially horizontal closed position wherein said secondary flapper is seated upon said valve seat to block that portion of said flow passage which is not blocked by said main flapper when said main flapper is in its closed position, a second hollow tubular float slidably received on the exterior of said drop tube above said first float and below the top of said tank, secondary link means coupled at one end to said secondary flapper and coupled at its other end to said second float for pivoting said secondary flapper from its shielded closed position into the downward flow of liquid in said passage in response to upward movement of said second float induced by the rise of the level of liquid in said tank above a second preselected level higher than said first preselected level, said secondary link means including second spring means biasing said secondary link means in a direction urging said secondary flapper to its closed position with a force sufficient to overcome the net static head of liquid in said drop tube between said secondary flapper and said elevated supply source when said secondary flapper is in its closed position.

16. An overfill prevention valve for preventing overfilling of an underground fuel storage tank having an inlet opening at its top, said valve comprising an elongate hollow inlet tube projecting downwardly into said tank through said inlet opening in said tank from an upper inlet end adapted to receive fuel from a source at the exterior of said tank to a lower discharge end disposed in the interior of said tank at a substantial distance below the top of said tank, shut off valve means mounted in the interior of said tube above said discharge end normally disposed in an open position accommodating the free flow of fuel downwardly through the interior of said tube from said inlet end into said tank via said discharge end and actuable to a closed position wherein said valve means blocks the flow of fuel in a first portion of said discharge end of said tube while maintaining a second portion of said discharge end open to permit a reduced flow of fuel through the discharge end, float means located at the exterior of said tube below the top of said tank, means mounting said float means on said tube for guided vertical movement along said tube in response to the raising or lowering of the level of fuel within said tank, said float means being insertable into said tank via said inlet opening while mounted on said tube for said guided vertical movement, and actuating means coupling said float means to said valve means for shifting said valve mean from said open position to said closed position in response to upward movement of said float means by the rising of the level of fuel within said tank above a predetermined level, thereby generating a water hammer effect to indicate that the flow of fuel should be shut off.

17. The invention defined in claim 16 wherein said means mounting said float means on said tube comprises a first cylindrical section of said tube adjacent the lower end thereof of a first outer diameter less than that of said inlet opening in said tank, means defining a recessed section of said tube above said first section extending upwardly from an inwardly projecting upwardly facing shoulder at the upper end of said first section, said float means comprising a float member located within said recess and retained against horizontal movement relative to said tube outwardly beyond said shoulder.

18. The invention defined in claim 17 wherein said first cylindrical section constitutes a valve housing containing said valve means, said recessed section comprises an elongated hollow cylindrical tube of a second outer diameter less than said first diameter and projecting coaxially upwardly from said first section, and said float member comprises an elongate hollow cylindrical float coaxially received on said recessed section, said float having an inner diameter greater than said second diameter and an outer diameter less than said first diameter.

* * * * *